(12) United States Patent
Thames et al.

(10) Patent No.: US 7,361,710 B2
(45) Date of Patent: Apr. 22, 2008

(54) FUNCTIONALIZED VEGETABLE OIL DERIVATIVES, LATEX COMPOSITIONS AND COATINGS

(75) Inventors: Shelby F. Thames, Hattiesburg, MS (US); Oliver W. Smith, Petal, MS (US); James M. Evans, Hattiesburg, MS (US); Sandipan Dutta, Hattiesburg, MS (US); Lianzhou Chen, Raleigh, NC (US)

(73) Assignee: Southern Diversified Products, LLC, Hattiesburg, MS (US)

(*) Notice: Subject to any disclaimer, the term of this patent is extended or adjusted under 35 U.S.C. 154(b) by 657 days.

(21) Appl. No.: 10/800,410

(22) Filed: Mar. 12, 2004

(65) Prior Publication Data

US 2005/0203246 A1 Sep. 15, 2005

(51) Int. Cl.
*C08F 267/02* (2006.01)
*C08F 267/06* (2006.01)

(52) U.S. Cl. ............... 524/785; 106/31.29; 106/31.61; 525/279

(58) Field of Classification Search ............... 524/785; 106/31.29, 31.61; 525/279
See application file for complete search history.

(56) References Cited

U.S. PATENT DOCUMENTS

| | | | |
|---|---|---|---|
| 2,593,444 A | 4/1952 | Harrison | 526/329.1 |
| 3,010,925 A | 11/1961 | Lynn | 524/313 |
| 3,714,100 A | 1/1973 | Biale et al. | 260/29.6 |
| 3,952,032 A | 4/1976 | Vrancken et al. | 260/404.8 |
| 3,993,612 A | 11/1976 | Aihara et al. | 524/559 |
| 4,048,136 A | 9/1977 | Kobayashi et al. | 260/42.14 |
| 4,131,580 A | 12/1978 | Emmons et al. | 260/29.6 |
| 4,141,868 A | 2/1979 | Emmons et al. | 260/23 |
| 4,144,212 A | 3/1979 | Linder et al. | 260/29.7 |
| 4,226,754 A | 10/1980 | Yun et al. | 260/29.6 |
| 4,261,872 A | 4/1981 | Emmons et al. | 260/22 |
| 4,289,675 A | 9/1981 | Krajewski | 260/29.6 |
| 4,356,128 A | 10/1982 | Rogier | 260/465.6 |
| 4,540,739 A | 9/1985 | Midgley | 524/764 |
| 4,626,582 A | 12/1986 | Virnig et al. | 526/298 |
| 4,745,213 A | 5/1988 | Schlosser et al. | 560/217 |
| 4,791,167 A | 12/1988 | Saukaitis | 524/544 |
| 4,803,252 A | 2/1989 | Kida et al. | 526/297 |
| 4,826,907 A | 5/1989 | Murao et al. | 524/394 |
| 4,906,684 A | 3/1990 | Say | 524/548 |
| 5,122,567 A | 6/1992 | Spada et al. | 524/818 |
| 5,243,069 A | 9/1993 | Emmons | 560/224 |
| 5,288,807 A | 2/1994 | Hinz | 525/279 |
| 5,312,889 A | 5/1994 | Frische et al. | 528/74.5 |
| 5,362,816 A | 11/1994 | Snyder et al. | 525/329.9 |
| 5,435,879 A | 7/1995 | Knutson et al. | 156/327 |
| 5,733,970 A | 3/1998 | Craun | 524/811 |
| 5,750,751 A | 5/1998 | Saam | 554/165 |
| 6,001,913 A | 12/1999 | Thames et al. | 524/398 |
| 6,140,435 A | 10/2000 | Zanotti-Russo | 526/238.2 |
| 6,174,948 B1 * | 1/2001 | Thames et al. | 524/398 |
| 6,203,720 B1 | 3/2001 | Thames et al. | 252/182.12 |
| 2003/0045609 A1 | 3/2003 | Thames et al. | 523/161 |
| 2003/0195297 A1 | 10/2003 | Burghart et al. | 525/191 |

FOREIGN PATENT DOCUMENTS

| | | |
|---|---|---|
| EP | 319608 A1 | 6/1989 |
| EP | 0 466 409 A1 | 1/1992 |
| IN | 154467 | 7/1980 |
| IN | 153599 | 6/1981 |
| IN | 154647 | 8/1981 |

OTHER PUBLICATIONS

"Caster-Based Derivatives; Synthesis of Some Acrylate Esters" by Jane S. Nelson and Thomas H. Applewhite, *Journal of the American Oil Chemists' Society*, Sep. 1966, pp. 542-545.

* cited by examiner

*Primary Examiner*—Kriellion A Sanders
(74) *Attorney, Agent, or Firm*—Kirkpatrick & Lockhart Preston Gates Ellis LLP

(57) ABSTRACT

An ethylenically unsaturated vegetable oil is modified by the addition of an enophile or dienophile having an acid, ester or anhydride functionality. The modified vegetable oil is then reacted with a functional vinyl monomer to form a vegetable oil derivative. The vegetable oil derivative is useful in forming latexes and coatings.

15 Claims, No Drawings

FUNCTIONALIZED VEGETABLE OIL DERIVATIVES, LATEX COMPOSITIONS AND COATINGS

BACKGROUND OF THE INVENTION

The present invention is directed to vegetable oil derivatives. More particularly, the present invention is directed to functionalized vegetable oil derivatives that can be used in latexes and coatings.

One problem encountered by coatings manufacturers is the development of formulations containing low VOC-coalescing aids or plasticizers. For instance, emulsion polymers are currently formulated with coalescing aids or plasticizers in order to form films at and below ambient conditions yet dry to films of sufficient glass transition temperature ($T_g$) to perform adequately at and above room temperature. In general, the ability of emulsion polymers to form or coalesce into film is governed by the minimum film forming temperature (MFT) of the polymer in question. Low MFT polymers are required in order to exhibit coalescence, flow, and surface wetting properties. However, if the polymer remains soft and tacky, the coatings are not usable. Therefore, it is necessary to develop a technology in which coating formulations contain suitable ingredients to provide an initial low MFT, which, upon application, form nontacky, durable, hard, and water resistant surfaces having a $T_g$ significantly above their MFT.

Various other coating compositions which cure under ambient conditions are known in the prior art. A few such examples involve curing by a chemical reaction such as epoxide-carboxylic acid reaction, isocyanate-moisture reaction, polyaziridine-carboxylic acid reaction, and activated methylene-unsaturated acrylic reaction.

Recently, a number of new latex or emulsion compositions derived from semi-drying and/or non-drying oils have been developed for use in coatings, adhesives and inks. Such compositions are disclosed in U.S. Pat. Nos. 6,001,913; 6,174,948; and 6,203,720 each of which is incorporated herein by reference in its entirety.

The search for additional compositions that can be used in latexes and coatings is continuing. Accordingly, it would be an advancement in the art to provide compositions that can be made from renewable resources that are suitable for use in latexes and coatings.

SUMMARY OF THE INVENTION

The present invention is directed to functionalized vegetable oil derivatives which are useful in latexes and coatings. In the preferred embodiment, an ethylenically unsaturated vegetable oil is modified by the addition of an enophile or dienophile having an acid, ester or anhydride functionality The modified vegetable oil is then reacted with a functional vinyl monomer to form the vegetable oil derivative. Suitable monomers include hydroxy, amine, thiol, oxirane vinyl monomers.

The functionalized vegetable oil derivatives can be formulated into latexes and other coating compositions.

DETAILED DESCRIPTION OF THE PREFERRED EMBODIMENTS

The present invention is directed to a series of vegetable oil macromonomers and their use in latexes and coatings. The invention is also directed to the method of producing these macromonomers. This set of monomers is derived by reacting unsaturated vegetable oils with an enophile or dienophile having an acid, ester or anhydride functionality, and then reacting the derivative with a suitable hydroxy, amine, thiol, oxirane, or other functional vinyl monomer.

In a preferred embodiment, an unsaturated vegetable oil, such as soybean oil is reacted with maleic anhydride to form a maleinized vegetable oil as schematically shown in Reaction 1. Preferably, the reaction is performed at a temperature of about 200° C. to about 240° C. More preferably, the reaction is performed at a temperature of about 210° C. to about 220° C.

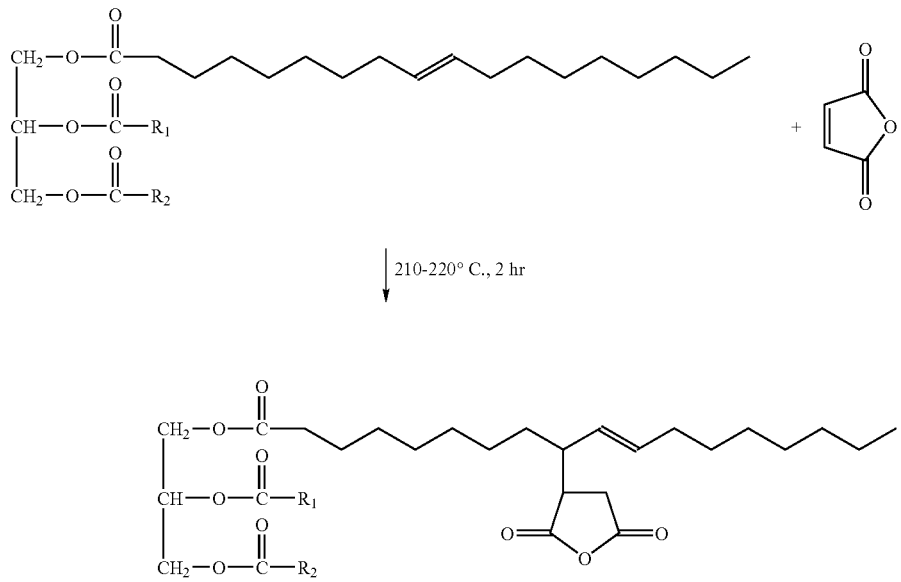

Reaction 1:

Any unsaturated vegetable oil can be used in the present invention. However, linseed oil, soybean oil and sunflower oil are preferred.

Many different compounds can be used to modify the unsaturated vegetable oil. They include enophiles and dienophiles that contain acid, ester or anhydride functionality. Examples include but are not limited to maleic anhydride, flumaric acid, itaconic anhydride and maleate esters.

The modified vegetable oil is then reacted with a suitable functional vinyl monomer to form the macromonomers of the present invention. A series of exemplary reactions are illustrated in Reactions 2a-2e. In Reaction 2a, the maleinized vegetable oil is reacted with hydroxyethyl acrylate (HEA) or hydroxyethyl methacrylate (HEMA). In Reaction 2b, the maleinized vegetable oil is reacted with 2-(tert-butylamino) ethyl methacrylate (BAEMA). In Reaction 2c, the maleinized vegetable oil is reacted with glycidyl acrylate (GA) or glycidyl methacrylate (GMA). In Reaction 2d, the malenized vegetable oil is reacted with allyl amine. Finally, in Reaction 2e, the maleinized vegetable oil is reacted with a vinyl ether such as hydroxybutyl vinyl ether where R is —$(CH_2)_4$—.

Reaction 2a

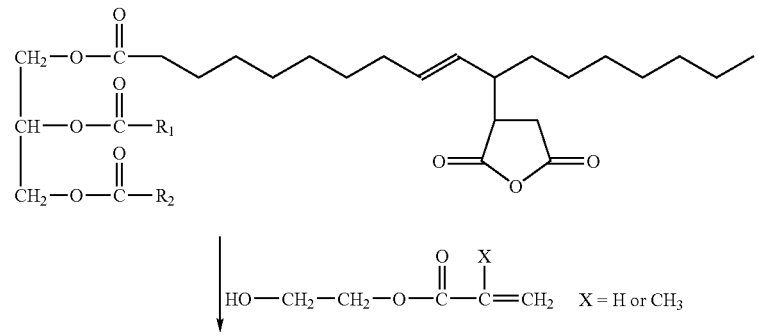

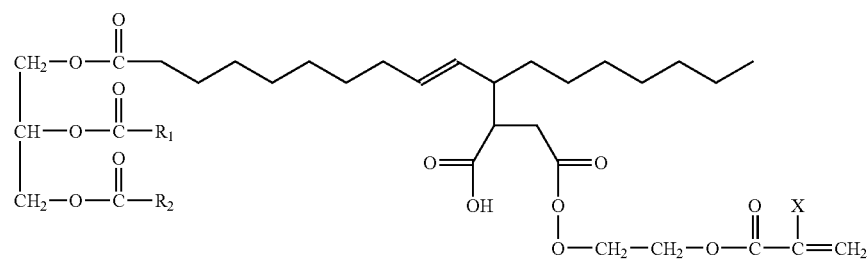

Reaction 2b

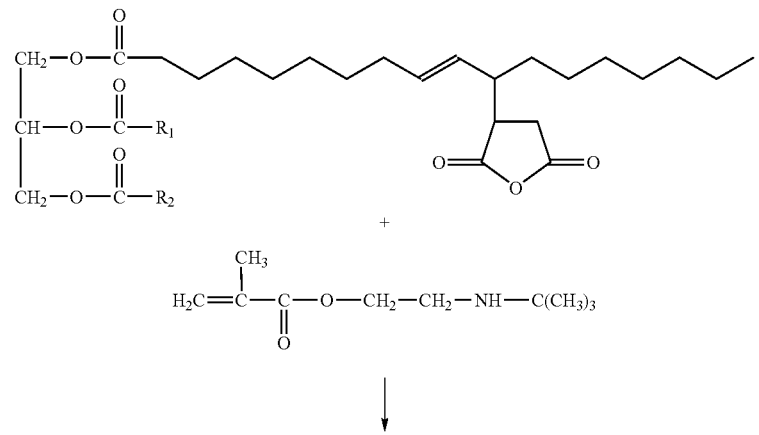

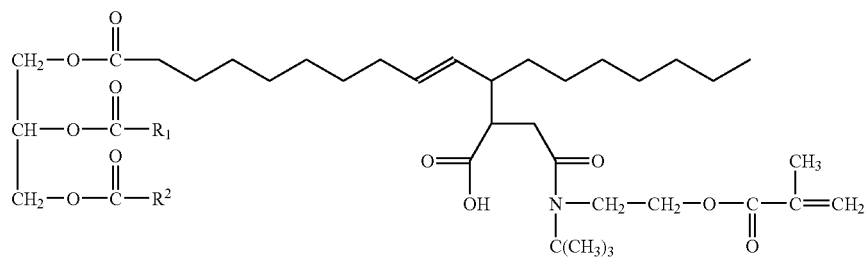
Reaction 2c
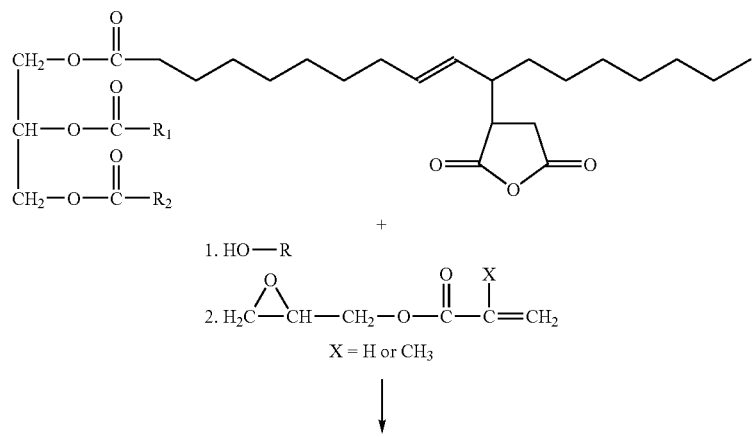
Reaction 2d
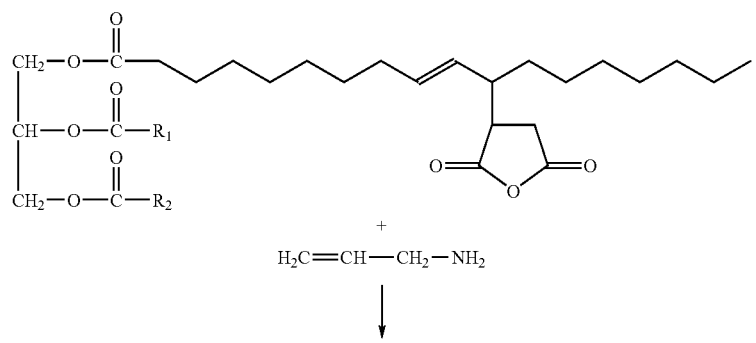

-continued

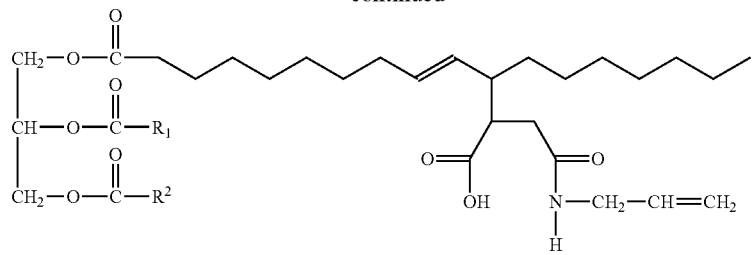

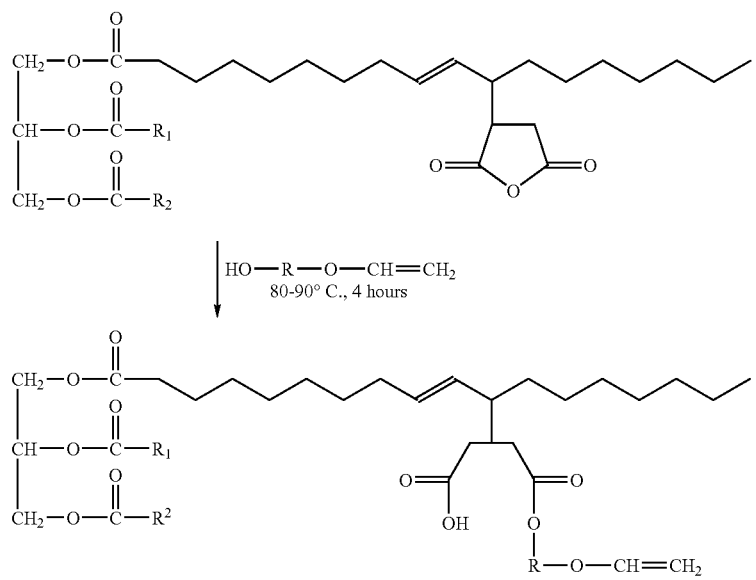

Reaction 2e

Examples of additional functionalized vinyl monomers that can be used in the present invention include, but are not limited to, hydroxypropyl acrylate, hydroxypropyl methacrylate, hydroxybutyl acrylate, hydroxybutyl methacrylate, allyl alcohol, 3-butenol, acrylamide and methacrylamide.

The macromonomers of the present invention can be used to make latexes and coatings compositions. In the preferred embodiment, the latexes are formed in a staged polymerization process as disclosed in published U.S. Application 2003/0045609, the teachings of which are hereby incorporated by reference. However, non-staged latex polymerization processes can also be used.

The modified vegetable oils of the present invention can then be copolymerized with conventional functionalized monomers in emulsion polymerization processes to produce vinyl polymers.

The invention is further understood by reference to the following examples which describe the formation of various macromonomers as well as the formulation of latexes and coatings.

EXAMPLE 1

Soybean oil (51.03 kg) was heated in a reactor to 100° C., and nitrogen gas was passed through the reaction mixture to remove the oxygen in the system. Maleic anhydride (14.17 kg) and xylene (2.93 mL) were added and the temperature was slowly raised to 205-210° C. and held for 2.5 hours. The maleic anhydride concentration was followed via gas chromatography (GC). Heating was stopped when the maleic anhydride concentration reached 1-2%, and the reaction mixture was cooled to 90° C.

Phenothiazine (86 g) was mixed with hydroxyethyl acrylate (13.30 kg) and added to the reactor. Next, 86 g of phosphoric acid (85% solution in water) was added to the reaction mixture. The temperature was raised to 110-115° C. and heating was continued for 2.5 hours. Heating was stopped when the hydroxyethyl acrylate concentration dropped below 4% (determined by GC). The reaction mixture was cooled to 60-70° C. and the reaction product, monomer 'A' was discharged.

EXAMPLE 2

Maleic anhydride (48 g) was mixed with linseed oil (152 g) and nitrogen gas was passed through the reaction mixture to remove the oxygen in the system. The reaction mixture was heated to 150° C. over 30 minutes and then heated to 200° C. where it was held for 2.5 hours. The reaction mixture was cooled to 50° C., and hydroxyethyl acrylate (58 g), phenothiazine (0.25 g), and phosphoric acid, 85% solution in water (0.25 g) were added to the reaction mixture.

The reaction was continued for 3-5 hours at 80° C. till all the hydroxyethyl acrylate had reacted to yield monomer 'B'.

EXAMPLE 3

Maleic anhydride (72 g) was mixed with soybean oil (221 g) and nitrogen gas was passed through the reaction mixture to remove the oxygen in the system. The reaction mixture was heated to 150° C. over 30 minutes and then heated to 200° C. where it was held for 2.5 hours. The reaction mixture was cooled to 50° C., and hydroxyethyl methacrylate (105 g), phenothiazine (0.25 g), and 1-methyl imidazole (0.30 g) were added to the reaction mixture. The reaction was continued for 3-5 hours at 110° C. till all the hydroxyethyl acrylate had reacted to yield monomer 'C'.

EXAMPLE 4

Maleic anhydride (46 g) was mixed with linseed oil (215 g) and nitrogen gas was passed through the reaction mixture to remove the oxygen in the system. The reaction mixture was heated to 150° C. over 30 minutes and then heated to 200° C. where it was held for 2.5 hours. The reaction mixture was cooled to 50° C., and hydroxyethyl acrylate (61 g), phenothiazine (0.25 g), and phosphoric acid, 85% solution in water (0.3 g) were added to the reaction mixture. The reaction was continued for 3-5 hours at 110° C. till all the hydroxyethyl acrylate had reacted to yield monomer 'D'.

EXAMPLE 5

Maleic anhydride (477 g) was mixed with soybean oil (2150 g) and nitrogen gas was passed through the reaction mixture to remove the oxygen in the system. The reaction mixture was heated to 150° C. over 30 minutes and then heated to 215° C. where it was held for 2 hours. The reaction mixture was cooled to 90° C., and hydroxyethyl acrylate (565 g), phenothiazine (5 g), and phosphoric acid, 85% solution in water (5 g) were added to the reaction mixture. The reaction was continued for 4-5 hours at 110° C. till all the hydroxyethyl acrylate had reacted to yield monomer 'E'.

EXAMPLE 6

Soybean oil (51.03 kg) was heated in a reactor to 100° C., and nitrogen gas was passed through the reaction mixture to remove the oxygen in the system. Maleic anhydride (11.21 kg) and xylene (2.93 mL) were added and the temperature was slowly raised to 205-210° C. and held for 2.5 hours. The maleic anhydride concentration was followed via GC. Heating was stopped when the maleic anhydride concentration reached 1-2%, and the reaction mixture was cooled to 90° C. Phenothiazine (50 g) was mixed with hydroxyethyl acrylate (8.99 kg) and added to the reactor. Next, 81 g of phosphoric acid (85% solution in water) was added to the reaction mixture. The temperature was raised to 120° C. and heating was continued for 2.5 hours. Heating was stopped when the hydroxyethyl acrylate concentration dropped below 4% (determined by GC). The reaction mixture was cooled to 60-70° C. and the reaction product, monomer 'F', was discharged.

EXAMPLE 7

Linseed oil (51.03 kg) was heated in a reactor to 100° C., and nitrogen gas was passed through the reaction mixture to remove the oxygen in the system. Maleic anhydride (11.21 kg) and xylene (2.93 mL) were added and the temperature was slowly raised to 205-210° C. and held for 2.5 hours. The maleic anhydride concentration was followed via GC. Heating was stopped when the maleic anhydride concentration reached 1-2%, and the reaction mixture was cooled to 90° C.

Phenothiazine (50 g) was mixed with hydroxyethyl acrylate (8.99 kg) and added to the reactor. Next, 81 g of phosphoric acid (85% solution in water) was added to the reaction mixture. The temperature was raised to 120° C. and heating was continued for 2.5 hours. Heating was stopped when the hydroxyethyl acrylate concentration dropped below 4% (determined by GC). The reaction mixture was cooled to 60-70° C. and the reaction product, monomer 'G', was discharged.

EXAMPLE 8

6 Soybean oil (981 g) was heated in a reactor to 100° C., and nitrogen gas was passed through the reaction mixture to remove the oxygen in the system. Maleic anhydride (323 g) and xylene (1 drop) were added and the temperature was slowly raised to 205-210° C. and held for 4.5 hours. The maleic anhydride concentration was followed via GC. Heating was stopped when the maleic anhydride concentration reached 1-2%, and the reaction mixture was cooled to 90° C.

Phenothiazine (1.35 g) was mixed with hydroxyethyl acrylate (253 g) and added to the reactor. Next, 1.54 g of phosphoric acid (85% solution in water) was added to the reaction mixture. The temperature was raised to 120° C. and heating was continued for 3 hours. The reaction mixture was cooled to 60-70° C. and the reaction product, monomer 'H', was discharged.

EXAMPLE 9

Soybean oil (981 g) was heated in a reactor to 100° C., and nitrogen gas was passed through the reaction mixture to remove the oxygen in the system. Maleic anhydride (323 g) and xylene (1 drop) were added and the temperature was slowly raised to 205-210° C. and held for 4.5 hours. The maleic anhydride concentration was followed via GC. Heating was stopped when the maleic anhydride concentration reached 1-2%, and the reaction mixture was cooled to 90° C.

Phenothiazine (1.35 g) was mixed with hydroxyethyl methacrylate (305 g) and added to the reactor. Next, 1-methyl imidazole (1.54 g) was added to the reaction mixture. The temperature was raised to 120° C. and heating was continued for 3 hours. The reaction mixture was cooled to 60-70° C. and the reaction product, monomer 'I', was discharged.

EXAMPLE 10

Linseed oil (152 g) was heated in a reactor to 100° C., and nitrogen gas was passed through the reaction mixture to remove the oxygen in the system. Maleic anhydride (48 g) and xylene (1 drop) were added and the temperature was slowly raised to 205-210° C. and held for 4.5 hours. The maleic anhydride concentration was followed via GC. Heating was stopped when the maleic anhydride concentration reached 1-2%, and the reaction mixture was cooled to 90° C.

Phenothiazine (0.5 g) was mixed with hydroxyethyl methacrylate (75 g) and added to the reactor. Next, 0.5 g of phosphoric acid (85% solution in water) was added to the reaction mixture. The temperature was raised to 100° C. and heating was continued for 4-5 hours. The reaction mixture was cooled to 60-70° C. and the reaction product monomer 'J', was discharged.

EXAMPLE 11

Sunflower oil (52.6 kg) was heated in a reactor to 100° C., and nitrogen gas was passed through the reaction mixture to remove the oxygen in the system. Maleic anhydride (11.57 kg) was added and the temperature was slowly raised to 205-210° C. and held for 2.5 hours. The maleic anhydride concentration was followed via GC. Heating was stopped when the maleic anhydride concentration reached 1-2%, and the reaction mixture was cooled to 90° C.

Phenothiazine (125 g) was mixed with hydroxyethyl acrylate (13.69 kg) and added to the reactor. Next, 125 g of phosphoric acid (85% solution in water) was added to the reaction mixture. The temperature was raised to 100° C. and heating was continued for 4-5 hours. The reaction mixture was cooled to 60-70° C. and the reaction product monomer 'K' was discharged.

EXAMPLE 12

Maleic anhydride (48 g) was mixed with sunflower oil (152 g) and nitrogen gas was passed through the reaction mixture to remove the oxygen in the system. The reaction mixture was heated to 150° C. over 30 minutes and then heated to 200° C. where it was held for 2.5 hours. The reaction mixture was cooled to 50° C., and hydroxyethyl acrylate (58 g), phenothiazine (0.25 g), and phosphoric acid, 85% solution in water (0.25 g) were added to the reaction mixture. The reaction was continued for 3-5 hours at 80° C. till all the hydroxyethyl acrylate had reacted to yield monomer 'L'.

EXAMPLE 13

Maleic anhydride (49 g) was mixed with soybean oil (221 g) and nitrogen gas was passed through the reaction mixture to remove the oxygen in the system. The reaction mixture was heated to 150° C. over 30 minutes and then heated to 200° C. where it was held for 2.5 hours. The reaction mixture was cooled to 50° C., and styrene (100 g), and allyl amine (28 g) were added to the reaction mixture. The reaction was continued for 5 hours 11 at 50° C. to yield monomer 'M'.

EXAMPLE 14

Maleic anhydride (49 g) and 2-methylmercaptobenzoylthiazole (0.1 g) were mixed with soybean oil (221 g) and nitrogen gas was passed through the reaction mixture to remove the oxygen in the system. The reaction mixture was heated to 150° C. over 30 minutes and then heated to 215° C. where it was held for 2.5 hours. The reaction mixture was cooled to 70° C., and phenothiazine (0.35 g), and 2-(tert-butyl amino) ethyl methacrylate (92 g) were added to the reaction mixture. The reaction was continued for 5 hours at 80° C. to yield monomer 'N'.

EXAMPLE 15

Maleic anhydride (49 g) and 2-methylmercaptobenzoylthiazole (0.1 g) were mixed with soybean oil (221 g) and nitrogen gas was passed through the reaction mixture to remove the oxygen in the system. The reaction mixture was heated to 150° C. over 30 minutes, and then heated to 215° C. where it was held for 2.5 hours. The reaction mixture was cooled to 90° C., and water (27 g) was added to the reaction mixture. The reaction was continued for 2.5 hours at 95° C. Then phenothiazine (0.35 g), glycidyl acrylate (128 g), and tetramethylammonium chloride (1 g) were added. The reaction was continued for 4 hours at 100° C. to yield monomer 'O'.

EXAMPLE 16

Maleic anhydride (49 g) and xylene (0.1 g) were mixed with soybean oil (221 g) and nitrogen gas was passed through the reaction mixture to remove the oxygen in the system. The reaction mixture was heated to 150° C. over 30 minutes and then heated to 215° C. where it was held for 2.5 hours. The reaction mixture was cooled to 90° C., and poly(ethylene glycol)monomethyl ether (140 g) and 1-methylimidazole (0.5 g) were added to the reaction mixture. The reaction was continued for 2.5 hours at 130° C. Next, phenothiazine (0.35 g), glycidyl methacrylate (56.8 g), and tetramethylammonium chloride (1 g) were added. The reaction was continued for 4 hours at 100° C. to yield monomer 'P'.

EXAMPLE 17

Soybean oil (981 g) was heated in a reactor to 100° C., and nitrogen gas was passed through the reaction mixture to remove the oxygen in the system. Maleic anhydride (197 g) and 2-mercaptobenzothiazole (0.363 g) were added and the temperature was slowly raised to 215-220° C. and held for 2.5 hours. The maleic anhydride concentration was followed via GC. Heating was stopped when the maleic anhydride concentration reached 1-2%, and the reaction mixture was cooled to 90° C.

Phenothiazine (1.35 g) was mixed with hydroxybutyl vinyl ether (233 g) and added to the reactor. Next, 1-methyl imidazole (1.54 g) was added to the reaction mixture. The temperature was raised to 100° C. and heating was continued for 2 hours. The reaction mixture was cooled to 60-70° C. and the reaction product, monomer 'Q' was discharged.

EXAMPLE 18

Latex Synthesis

The first stage pre-emulsion was prepared by dissolving 0.005 lb (2.27 g) of Rhodapex CO 436, and 0.002 lb (0.91 g) of Igepal® CO-887 in 0.78 lb (353.38 g) of deionized water. Next, 0.072 lb (32.65 g) of butyl acrylate, 0.056 lb (25.40 g) of methyl methacrylate, and 0.0014 lb (0.64 g) of methacrylic acid was added and the mixture was stirred at high speed for 20 minutes. The initiator solution was prepared by dissolving 0.02 lb (9.07 g) of ammonium persulfate in 0.177 lb (80.29 g) of deionized water.

The second stage pre-emulsion was prepared by dissolving 0.0146 lb (6.62 g) of sodium bicarbonate, 0.092 lb (41.73 g) of Rhodapex® CO-436, and 0.034 lb (15.42 g) of Igepal CO-887 in 1.48 lb (671.32 g) of deionized water. Next, 1.34 lb (607.81 g) of butyl acrylate, 1.064 lb (482.62 g) of methyl methacrylate, 0.03 lb (13.61 g) of methacrylic acid, 0.03 lb (13.61 g) of divinyl benzene, and 0.15 lb (68.25 g) of monomer 'F' were added, and stirred for 5 minutes. An aqueous solution of diacetone acrylamide was prepared by dissolving diacetone acrylamide (0.117 lb, 53.07 g) in deionized water (0.132 lb, 59.87 g) and added to the pre-emulsion and stirred for 20 minutes at high 11 agitation.

A 1-gallon reactor was charged with 0.97 lb (439.98 g) of deionized water and 0.01 lb (4.54 g) of Rhodapex CO-436. The mixture was stirred well, purged with nitrogen for 15 minutes, and heated to 80±2° C. The first stage pre-emulsion solution and 0.035 lb (15.87 g) of the initiator solution were added to the reactor. 15 minutes later, the second stage pre-emulsion, and the remaining initiator solution are fed into the reactor at constant rate over 2.75 hours and 3.0 hours, respectively.

An oxidizer solution was prepared by dissolving 0.0032 lb (1.45 g) of t-butyl hydroperoxide in 0.026 lb (11.79 g) of deionized water. A reducer solution was prepared by dissolving 0.003 lb (1.36 g) of sodium metabisulfite in 0.026 lb (11.79 g) of deionized water. The oxidizer and reducer solutions were charged to the reactor simultaneously over 1.5 hours at a constant rate. The reactor was held at the same temperature for another 30 minutes and cooled over 45 minutes to 35° C. Next, 0.57 lb (258.55 g) of ammonia was added slowly under stirring.

In another container, 0.059 lb (26.76 g) of adipic dihydrazide was dissolved in 0.06 lb (27.21 g) of deionized water, and added slowly to the latex under stirring. Lastly, the latex was filtered through a 100 mesh filter.

EXAMPLE 19

Latex Synthesis (Continued)

Latexes with varying percentages of monomer 'F' were synthesized as follows. A latex without any vegetable oil monomer was synthesized and used as the control.

|  | 2% Monomer 'F' | 4% Monomer 'F' | 6% Monomer 'F' | Control |
|---|---|---|---|---|
| Kettle Charge | | | | |
| Deionized water | 110.0 | 110.0 | 110.0 | 110.0 |
| Rhodapex CO-436 | 1.2 | 1.2 | 1.2 | 1.2 |
| Stage I | | | | |
| Deionized water | 166.9 | 166.9 | 166.9 | 166.9 |
| Sodium bicarbonate | 1.7 | 1.7 | 1.7 | 1.7 |
| Rhodapex CO-436 | 10.4 | 10.4 | 10.4 | 10.4 |
| Igepal CO-887 | 3.8 | 3.8 | 3.8 | 3.8 |
| Butyl acrylate | 165.0 | 160.0 | 156.0 | 169.0 |
| Methyl methacrylate | 123.0 | 121.0 | 120.0 | 125.0 |
| Divinyl benzene | 6.6 | 6.6 | 6.6 | 6.6 |
| Methacrylic acid | 3.2 | 3.2 | 3.2 | 3.2 |
| Diacetone acrylamide | 13.2 | 13.2 | 13.2 | 13.2 |
| Monomer 'F' | 6.2 | 12.4 | 18.8 | 0.0 |
| Initiator | | | | |
| Ammonium persulfate | 2.2 | 2.2 | 2.2 | 2.2 |
| Deionized water | 22.0 | 22.0 | 22.0 | 22.0 |
| Chaser | | | | |
| Sodium metabisulfite | 0.4 | 0.4 | 0.4 | 0.4 |
| Deionized water | 3.0 | 3.0 | 3.0 | 3.0 |
| t-Butyl hydroperoxide | 0.4 | 0.4 | 0.4 | 0.4 |
| Deionized water | 3.0 | 3.0 | 3.0 | 3.0 |
| Ammonium hydroxide | 2.1 | 2.1 | 2.1 | 2.1 |
| Adipic dihydrazide | 6.8 | 6.8 | 6.8 | 6.8 |
| Total | 650.9 | 650.1 | 651.5 | 650.7 |

EXAMPLE 20

The latexes synthesized in examples 18 and 19 were formulated into semi-gloss coatings as per the following recipe.

|  | Pounds | Gallons |
|---|---|---|
| Grind | | |
| Water | 100.00 | 12.00 |
| Natrosol ® Plus 330 | 2.00 | 0.17 |
| Potassium carbonate | 2.50 | 0.13 |
| Tamol ® 2001 | 6.25 | 0.68 |
| Drewplus ® L-475 | 2.00 | 0.26 |
| Triton ® CF-10 | 1.00 | 0.11 |
| Kathon ® LX 1.5% | 1.50 | 0.18 |
| Ti-Pure ® 706 | 230.00 | 6.90 |
| Minugel ® 400 | 5.0 | 0.25 |
| Water | 80.00 | 9.60 |
| Total | 430.25 | 30.30 |
| Letdown | | |
| Water | 138.00 | 16.57 |
| Drewplus ® L-475 | 2.00 | 0.26 |
| Strodex ® PK | 4.00 | 0.44 |
| Drewthix ® 864 | 1.00 | 0.11 |
| Drewthix 4025 | 10.00 | 1.15 |
| Latex | 469.00 | 53.30 |
| Total | 1054.25 | 102.13 |

The coatings were evaluated for various properties, and the test results are listed in the following table.

|  | Control | 2% Monomer 'F | 4% Monomer 'F' | 6% Monomer 'F' |
|---|---|---|---|---|
| Stormer viscosity, KU | 94.7 | 93.8 | 93.4 | 97.9 |
| ICI viscosity, Poises | 0.70 | 0.55 | 0.43 | 0.40 |
| Gloss at 20° | 20.0 | 17.3 | 17.2 | 16.6 |
| Gloss at 60° | 58.1 | 56.4 | 56.3 | 55.3 |
| 1-day block resistance | 3.5 | 3.5 | 3.5 | 4.0 |
| 7-day block resistance | 4.0 | 5.0 | 5.0 | 5.0 |
| 1 week scrub resistance | 3039 | 2267 | 2354 | 1841 |

EXAMPLE 21

|  | |
|---|---|
| Kettle Charge | |
| Deionized water | 140.00 |
| Stage I | |
| Deionized water | 165.00 |
| Rhodafac ® RS-710 | 22.40 |
| Ammonium bicarbonate | 2.80 |
| Methyl methacrylate | 98.56 |
| Butyl acrylate | 103.60 |
| Hydroxy ethyl acrylate | 14.00 |
| Silane | 28.00 |
| Monomer 'F' | 28.00 |
| Methacrylic acid | 8.40 |
|  | 470.76 |
| Initiator | |
| Deionized water | 25.00 |
| Ammonium persulfate | 0.39 |
| t-Butyl hydroperoxide | 0.76 |
| Deionized water | 25.50 |
| Bruggolite ® FF6 | 0.65 |

-continued

| Chaser | |
|---|---|
| t-Butyl hydroperoxide | 0.12 |
| Deionized water | 5.00 |
| Bruggolite FF6 | 0.10 |
| Deionized water | 5.00 |
| Total | 673.29 |

What is claimed is:

1. A composition comprising the reaction product of:
   an unsaturated vegetable oil that has been modified by the addition of an enophile or
   dienophile having an acid, ester or anhydride functionality; and
   a functional vinyl monomer.

2. The composition of claim 1 wherein the vegetable oil is selected from the group consisting of soybean oil, linseed oil and sunflower oil.

3. The composition of claim 1 wherein the vegetable oil comprises soybean oil.

4. The composition of claim 1 wherein the vegetable oil comprises linseed oil.

5. The composition of claim 1 wherein the vegetable oil comprises sunflower oil.

6. The composition of claim 1 wherein the enophile or dienophile is selected from the group consisting of maleic anhydride, fumaric acid, itaconic anhydride and maleate esters.

7. The composition of claim 1 wherein the functional vinyl monomer is selected from the group consisting of hydroxy, amine, thiol and oxirane vinyl monomers.

8. The composition of claim 1 wherein the vinyl monomer is selected from the group consisting of hydroxyethyl acrylate, hydroxyethyl methacrylate, allyl amine, 2-(tert-butylamino)ethyl methacrylate, glycidyl acrylate, glycidyl methacrylate, and hydroxybutyl vinyl ether.

9. A process for forming a functionalized vegetable oil derivative composition of claim 1 comprising:
   modifying a vegetable oil by the addition of an enophile or dienophile having an acid, ester or anhydride functionality; and
   reacting the modified vegetable oil with a functionalized vinyl monomer to form the composition of claim 1.

10. The process of claim 9 wherein the reaction of the vegetable oil with the enophile or dienophile is performed at a temperature of about 200° C. to about 240° C.

11. The process of claim 9 wherein the vegetable oil is selected from the group consisting of soybean oil, linseed oil and sunflower oil.

12. The process of claim 9 wherein the functional vinyl monomer is selected from the group consisting of hydroxy ethyl acrylate, hydroxy ethyl methacrylate, allyl amine, 2-(tert-butylamino)ethyl methacrylate, glycidyl acrylate, glycidyl methacrylate, and hydroxybutyl vinyl ether.

13. A latex polymer comprising the polymerization product:
   an ethylenically unsaturated monomer suitable for forming a latex polymer; and the composition of claim 1.

14. The latex of claim 13 wherein the ethylenically unsaturated monomer is selected from the group consisting of vinyl acetate, vinyl chloride, vinyl ester of a saturated tertiary branched carboxylic acid, acrylonitrile, acrylamide, diacetone acrylamide, 2-ethylhexyl acrylate, 2-ethylhexyl methacrylate, 2-hydroxyethyl acrylate, 2-hydroxyethyl methacrylate, glycidyl acrylate, glycidyl methacrylate, acrylic acid, methacrylic acid, butyl acrylate, butyl methacrylate, methyl methacrylate, methyl acrylate, para-acetoxystyrene, and styrene.

15. A coating composition comprising a blended mixture of:
   a latex polymer of claim 13;
   a pigment; and
   a surface-active agent.

* * * * *